UNITED STATES PATENT OFFICE.

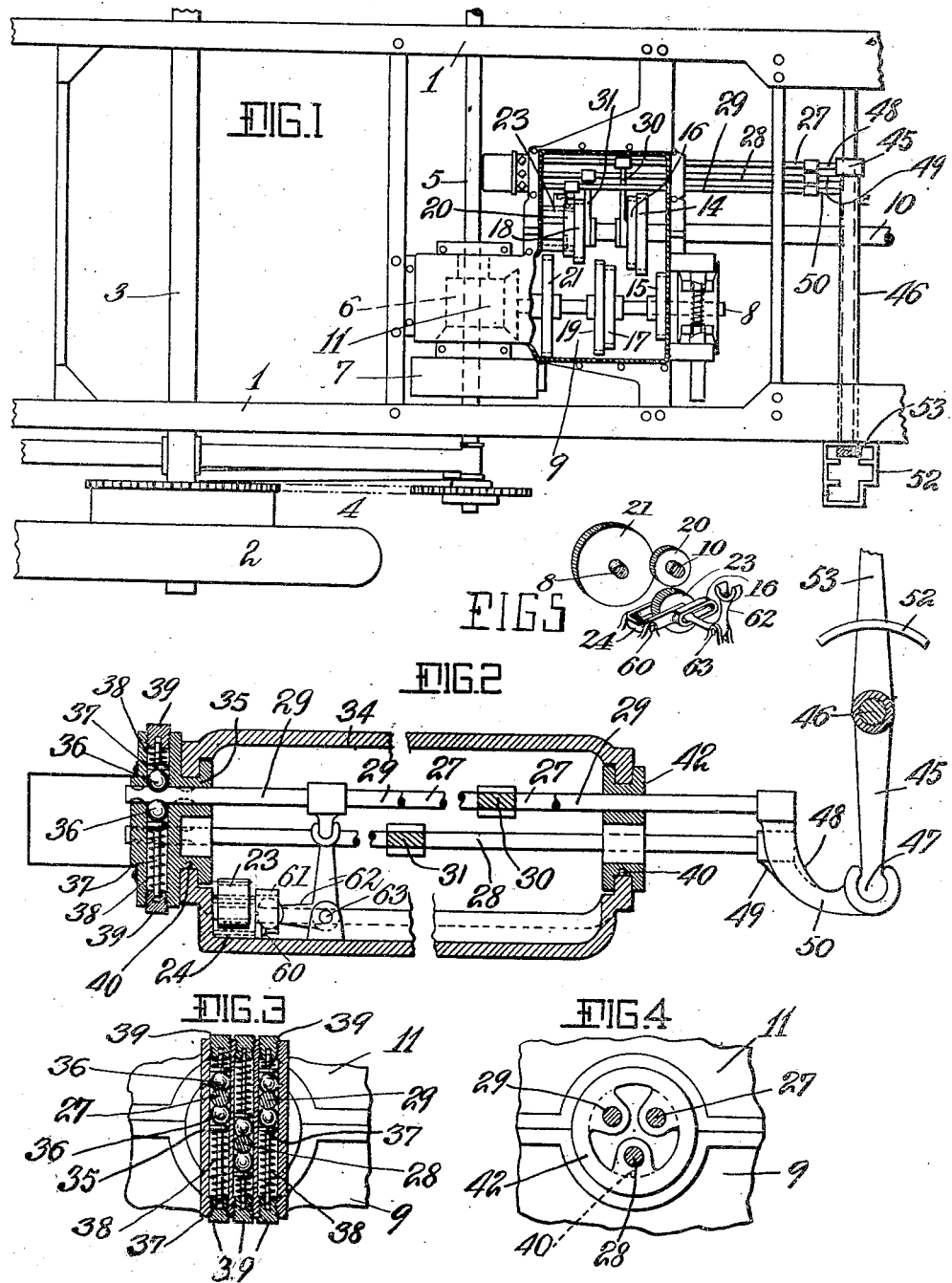

GIOVANNI ENRICO, OF TURIN, ITALY, ASSIGNOR, BY MESNE ASSIGNMENTS, TO SOCIETA FABBRICA ITALIANA AUTOMOBILI DI TORINO, OF TURIN, ITALY, A CORPORATION OF ITALY.

CHANGE-GEAR MECHANISM FOR VEHICLES.

No. 891,800.　　　　　Specification of Letters Patent.　　　　Patented June 23, 1908.

Application filed December 10, 1906, Serial No. 347,044. Renewed April 15, 1908. Serial No. 427,213.

*To all whom it may concern:*

Be it known that I, GIOVANNI ENRICO, a subject of the King of Italy, residing at Turin, Italy, in the Province of Piedmont, Italy, have invented certain new and useful Improvements in Change-Gear Mechanism for Vehicles, of which the following is a full, clear, and exact specification, This invention relates to change gear mechanism for vehicles, and has particular reference to improvements in the construction and arrangement of the change gear operating mechanism used in motor vehicles.

The invention more particularly has reference to means whereby the movable gears are at all times latched in one or another of their different positions, independently of the actuating mechanism, or of the slotted guide plate commonly used for determining the proper position of the actuating means to secure the desired selection of gears.

Another part of the invention comprises resilient latching means for each actuating rod normally holding it and the gear operated thereby against movement, and releasable upon movement to shift the gear from one position to another.

A further object of the invention is to provide a construction in which the parts shall be readily accessible without disarrangement for inspection or repair, and which will permit the parts to be easily taken apart and assembled.

In the accompanying drawings, Figure 1 is a plan view of a vehicle embodying the invention; Fig. 2 is a vertical section of the shifting rod casing; Fig. 3 is a detail view, showing the locking mechanism for the shifting rods and a portion of the casing, and Fig. 4 is a detail view showing the opposite end of the casing. Fig. 5 is a detail view showing the reversing gear.

1 represents the frame of the vehicle, 2 the wheel, 3 the rear axle, driven by chain 4 from jack shaft 5. The jack shaft 5, has a differential gear 6, brake 7, and is driven by an intermediate shaft 8, having bearings in a gear box 9, the upper half 11 of which is removable in order to permit access to the gears and the operating devices.

10 is the engine shaft carrying the sliding gears 14, 16, 18, 20, which mesh respectively with fixed gears 15, 17, 19, 21 carried by shaft 8, when properly manipulated. In order to reverse the direction of rotation of shaft 8, a wide intermediate idler gear 23 mounted on one arm of a short pivoted U-shaped lever 24 is provided, which can be thrown up to mesh with gears 20 and 21. For operating these gears on the forward speeds a series of rods 27, 28, carrying forks 30, 31, for moving gears 14, 16, 18, 20, are provided, and for operating the reverse gear a rod 29 is provided, these rods sliding through bushings in the ends of the casing and having yieldable engaging devices to hold them in either of two extreme positions (according to the speed desired) and in a normal neutral position. The rod 29, controlling the reverse gear has only two positions, one a normal position when out of operation, and the second and operating position when the intermediate idler is thrown up to engage with gears 20 and 21.

As shown herein the reverse is formed by connecting the gears 21 and 20 on shafts 8 and 10 respectively, by means of an intermediate idler 23, which idler is mounted in a pivoted U-shaped lever 24, pivoted on the casing at 60. It will be understood that the idler 23 is parallel to shafts 8 and 10, and to throw the idler up into mesh with gears 21 and 20, one end of the U-shaped lever 24 has a slotted portion 61 in which one end of a bell crank lever 62, pivoted on the casing at 63, engages. The other end of the bell crank 62 has a fork which is engaged by a lug on rod 29 so that when rod 29 is actuated to the right in Fig. 2, the lever 24 and the idler will be swung upward until it meshes with gears 20 and 21, the idler being of sufficient width to connect these gears when so swung up.

In one end of the rod casing 34 is a bushing 35, having three holes through which the shifting rods pass, and in this bushing, for each rod, are engaging devices consisting of oppositely disposed spring pressed balls 36 which engage notches in the rods when thrown to proper position. The balls are actuated by small plungers 37, and springs 38, and screw nuts or plugs 39 control the tension of the springs. The bushing 35 is grooved as shown, so as to be firmly held between the halves of the casing 34, and a pin 40 fits a hole in the bushing when the latter is in correct position. On the opposite end of the casing is a similar bushing 42 with the registering groove and pin, so that by removing the top casing, the rods and bushings can be lifted out as a whole, and replaced without requiring any particular adjustments. In order to operate the rods, a lever 45 carried by a reciprocatory rock shaft 46 is provided which is moved transversely to engage the rounded end 47 with one or the other of arms 48, 49, 50, carried by rods 27, 28, 29. To control the movements of the shaft 46, a guide plate 52, having a longitudinal slot and five short transverse slots is used, and a handle 53 controlled by the driver moves in the guide plate. Movement of the handle 53 longitudinally in the slot moves the end 47 of lever 45 into engagement with one or the other of arms 47, 48, 49, and movement of the handle 53 into the short slots rocks shaft 40 and moves the corresponding sliding rod, and the sliding gear operated thereby to the desired speed arrangement.

It will be seen that each rod is thus independently latched in its several positions, and that this latching means is releasable upon movement of the selected rod in meshing and unmeshing its movable gear, without affecting the latching means of the other gears. Also the selected gear, is positively latched, as well as the others, independently of the slotted plate 52, or of the friction of the actuating connections, and this latch is operated by pivotal movement of the lever before the gear can be shifted. This is preferably accomplished by the movement of the rod itself.

The operation of the mechanism will be clear from the foregoing description, and further explanation is unnecessary.

By the foregoing construction a gear shifting mechanism is provided which is much more accessible and simple than the arrangements in common use.

A feature of especial advantage in this invention is the unitary construction of the shifting rods, bushings and locking devices, which permits these parts to be taken out bodily and to be replaced in exactly the same relation, and at the same time, any individual rod or latch can be removed without disturbing the other parts of the mechanism.

The invention is capable of modifications and changes in the particular mechanism shown and described herein, and is not to be restricted to this particular construction.

Having thus described my invention, I declare that what I claim as new and desire to secure by Letters Patent, is,—

1. In a variable speed gear, the combination with changeable gears, of operating rods for said gears, a bushing carrying said rods, and resilient means carried by said bushing and holding said rods in position, except when operated by said selective means, substantially as described.

2. In a variable speed gear, the combination with changeable gears, of operating rods for said gears, a casing for said rods, a bushing carried by said casing and having passages for said rods, and engaging devices carried by said bushing, substantially as described.

3. In a variable speed gear, the combination with changeable gears, of operating rods therefor, a casing through which said rods move, and a single bearing block for said rods separably carried by said casing, substantially as described.

4. In a variable speed gear, the combination with changeable gears, and rods for moving said gears, a casing containing said rods, a bearing block at each end of the casing and carrying said rods, and a removable cover adapted to hold the blocks in position, substantially as described.

5. In a variable speed gear, the combination with changeable gears and rods for moving said gears, of a casing containing said rods, a bearing block at each end of the casing and carrying said rods, said blocks being formed to register with the casing when in operative position, substantially as described.

6. In a variable speed gear, the combination with changeable gears and rods for operating said gears, of a casing containing said rods, a bearing block at each end of the casing and carrying said rods, means for detachably holding said blocks in said casing, means for operating the rods selectively, and detachable connections between said operating means and said rods, substantially as described.

7. In a variable speed gear, the combination with changeable gears and rods for operating said gears, of a separable casing containing said rods, a bearing block at each end of the casing and carrying said rods, means whereby said blocks are rigidly held between the parts of said casing, means for operating the rods, and separable connections between said rod operating means and the rods, and between the rods and the gears, substantially as described.

8. In a speed changing mechanism, the combination with changeable gears and rods for operating said gears, selective means for operating said rods, a bearing block at each end of the casing and carrying said rods, means carried by said rods for moving said gears, and means carried by one of said blocks for engaging said rods in a plurality of positions, substantially as described.

9. In a speed changing mechanism, the combination with changeable gears and rods for operating said gears, selective means for operating said rods, and means permitting removal of said rods independently of the gears and the rod operating means, substantially as described.

10. The combination with a casing having a removable cover, of bushings held between said casing and cover, rods carried by said bushings, and changeable gearing within said casing controlled by said rods, substantially as described.

11. The combination with a casing having a removable cover, of bushings held between said casing and cover, rods carried by said bushings, changeable gearing within said casing controlled by said rods, and selective means for actuating said rods, substantially as described.

12. The combination with a casing having a removable cover, of bushings held between said casing and cover, rods carried by said bushings, changeable gearing within said casing controlled by said rods, and resilient means for engaging said rods in a plurality of positions, substantially as described.

13. The combination with a casing, of a driving and a driven shaft therein, change speed gearing between said shafts, means comprising a plurality of rods journaled in bushings in said casing and removable therefrom with the bushings for effecting speed changes, and selective means for operating said rods, substantially as described.

14. The combination with a casing, of a driving and a driven shaft therein, change speed gearing between said shafts, means comprising a plurality of rods journaled in bushings at opposite ends of said casing for effecting the speed changes, selective means for operating said rods, and resilient engaging means carried in one of said bushings for holding one of said rods, substantially as described.

In testimony whereof I affix my signature, in presence of two witnesses.

GIOVANNI ENRICO.

Witnesses:
 C. HAUSSMAN,
 JOSEPH FORNOS.